(12) United States Patent
Ogawa et al.

(10) Patent No.: US 9,690,136 B2
(45) Date of Patent: Jun. 27, 2017

(54) VEHICULAR DISPLAY APPARATUS

(71) Applicants: DENSO CORPORATION, Kariya, Aichi-pref. (JP); Honda Motor Co., Ltd., Tokyo (JP)

(72) Inventors: Naoto Ogawa, Kariya (JP); Takuo Yamamoto, Kariya (JP); Ryo Kobe, Wako (JP); Shinji Kamon, Wako (JP)

(73) Assignees: DENSO CORPORATION, Kariya, Aichi-pref. (JP); HONDA MOTOR CO., LTD., Minato-Ku, Tokyo (JP)

( * ) Notice: Subject to any disclaimer, the term of this patent is extended or adjusted under 35 U.S.C. 154(b) by 51 days.

(21) Appl. No.: 14/311,671

(22) Filed: Jun. 23, 2014

(65) Prior Publication Data

US 2014/0375926 A1 Dec. 25, 2014

(30) Foreign Application Priority Data

Jun. 25, 2013 (JP) ................. 2013-133033

(51) Int. Cl.
*G02F 1/1335* (2006.01)

(52) U.S. Cl.
CPC .. *G02F 1/133608* (2013.01); *G02F 1/133524* (2013.01); *G02F 1/133603* (2013.01); *G02F 2001/133607* (2013.01)

(58) Field of Classification Search
CPC ... G02F 1/133608; G02F 2001/133607; G02F 1/133603; G02F 1/1336; G02F 2001/133616; G02F 1/133606; G02F 1/133504; G02F 1/133615; G02F 1/133308; G02F 2001/133317; G02F 2001/133322; G02F 1/133605; G02F 2001/133626; G02B 6/0088; G02B 6/005; G02B 6/0068; G02B 6/0073; G02B 6/0083; G02B 6/0011;
(Continued)

(56) References Cited

U.S. PATENT DOCUMENTS 4,965,564 A 10/1990 Fabry et al.
7,740,390 B2 * 6/2010 Lee ...................... G02B 6/0078
362/23.06
(Continued)

FOREIGN PATENT DOCUMENTS

JP 2002107711 A * 4/2002
JP 2011-246082 A 12/2011

OTHER PUBLICATIONS

English translation of JP 2002107711 (A), Title: Liquid Crystal Display Device, Author: Baba Hideto; Date of publication: Apr. 10, 2002.*

*Primary Examiner* — Dung Nguyen
*Assistant Examiner* — Shan Liu
(74) *Attorney, Agent, or Firm* — Harness, Dickey & Pierce, P.L.C.

(57) ABSTRACT

A vehicular display apparatus includes a liquid crystal display unit and a display plate. The display plate includes a diffusion portion that transmits and diffuses light of a first light source, and a transmission display portion that permits light of a second light source to transmit through and illuminate a prescribed shape portion serving as a status display portion. The liquid crystal display unit provides a liquid crystal display using, as back light, the light diffused by the diffusion portion. The display plate includes a slit in a portion located in between the transmission display portion and the diffusion portion.

8 Claims, 3 Drawing Sheets

(58) Field of Classification Search
CPC .. G02B 6/0013; G02B 6/0015; G02B 6/0016; G02B 6/0018; G02B 6/002; G02B 6/0021; G02B 6/0023; G02B 6/0025; G02B 6/0026; G02B 6/0028; G02B 6/003; G02B 6/0031; G02B 21/0032; G02B 21/06; G02B 21/16; G02B 6/0033; G02B 6/0035; G02B 6/0036; G02B 6/0038; G02B 6/004; G02B 6/0041; G02B 6/0043; G02B 6/0045; G02B 6/0046; G02B 6/0048; G02B 6/0051; G02B 6/0053; G02B 6/0055; G02B 6/0056; G02B 6/0058; G02B 6/006; G02B 6/0061; G02B 6/0063; G02B 6/0065; G02B 6/0066; G02B 6/007; G02B 6/0071; G02B 6/0075; G02B 6/0076; G02B 6/0078; G02B 2006/12083; G02B 2006/12085; G02B 2006/12088; G02B 2006/1209; G02B 2006/12092; G02B 2006/12095; G01N 21/62; G01N 21/6458; B82Y 20/00
USPC .......................................... 359/385; 385/129
See application file for complete search history.

(56) References Cited

U.S. PATENT DOCUMENTS

| | | | | |
|---|---|---|---|---|
| 8,118,466 | B2* | 2/2012 | Cho | G02F 1/133308 349/65 |
| 2001/0000127 | A1* | 4/2001 | Maeda | G02B 6/0036 349/65 |
| 2001/0001565 | A1* | 5/2001 | Brandt | B60Q 3/042 349/11 |
| 2009/0154193 | A1* | 6/2009 | Yamada | G02B 6/0043 362/610 |
| 2010/0020567 | A1* | 1/2010 | Tatehata | G02B 6/0036 362/606 |
| 2010/0201816 | A1* | 8/2010 | Lee | B60R 1/12 348/148 |
| 2013/0321496 | A1* | 12/2013 | Weller | G02B 6/0078 345/694 |

* cited by examiner

VEHICULAR DISPLAY APPARATUS

CROSS REFERENCE TO RELATED APPLICATION

The present application is based on Japanese Patent Application No. 2013-133033 filed on Jun. 25, 2013, the disclosure of which is incorporated herein by reference.

TECHNICAL FIELD

The present disclosure relates to a vehicular display apparatus.

BACKGROUND ART

Patent Literature 1: JP 2002-107711 A

Patent Literature 1 discloses a display apparatus that includes (i) a liquid crystal display unit that provides a liquid crystal display using light of a first light source as back light, and (ii) a transmission display portion that transmits light of a second light source through a prescribed shape transmission portion to permit the prescribed shape transmission portion to be viewable. For instance, the liquid crystal display unit displays a vehicle speed and a remaining fuel. The transmission display portion displays an alarm by turning on the second light source when an anomaly arises in the vehicle.

A recent vehicular display apparatus has been required to display various kinds of information using a much smaller space. This leads to a request for a design to arrange the transmission display portion and the liquid crystal display portion to be closer to each other. Such a design involves a possibility of light leak. The light of the first light source used for the liquid crystal display portion may leak to the transmission display portion. The light of the second light source used for the transmission display portion may leak to the liquid crystal display portion.

SUMMARY

It is an object of the present disclosure to provide a vehicular display apparatus that helps prevent leakage of light of a first light source for liquid crystal display and leakage of light of a second light source for transmission display.

To achieve the above object, according to an example of the present disclosure, a vehicular display apparatus is provided to include a first light source, a second light source, a display plate, and a liquid crystal display unit. The display plate includes a diffusion portion that transmits and diffuses light from the first light source, and a transmission display portion that transmits light from the second light source and permits the light to transmit through and illuminate a prescribed shape portion. The liquid crystal display unit provides a liquid crystal display using the light diffused by the diffusion portion as back light. The display plate includes a slit in a portion located in between the transmission display portion and the diffusion portion.

A part of light entering the display plate propagates through an interior portion to advance in a direction orthogonal to a transmission direction (i.e., viewing direction) of the display plate. Under the configuration according to the example, the slit intercepts the light propagating through the interior portion of the display plate. Further, the slit is provided in between the transmission display portion and the diffusion portion; thus, the slit can help prevent the light of the first light source entering the diffusion portion from propagating through the interior portion of the display plate to leak to the transmission display portion. There is conventionally known a situation where the light leakage may cause a part of the transmission display portion to appear to be luminous even if the second light source is turned off. The above configuration according to the example helps prevent an occurrence of such a situation.

Similarly, the configuration according to the example helps prevent the light of the second light source entering the transmission display portion from propagating through the interior portion of the display plate to leak to the diffusion portion.

Similarly, there is conventionally known a situation where the light leakage may cause a part of the liquid crystal display portion to appear to be luminous even if the first light source is turned off. The above configuration according to the example also helps prevent an occurrence of such a situation.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

Figure 1:
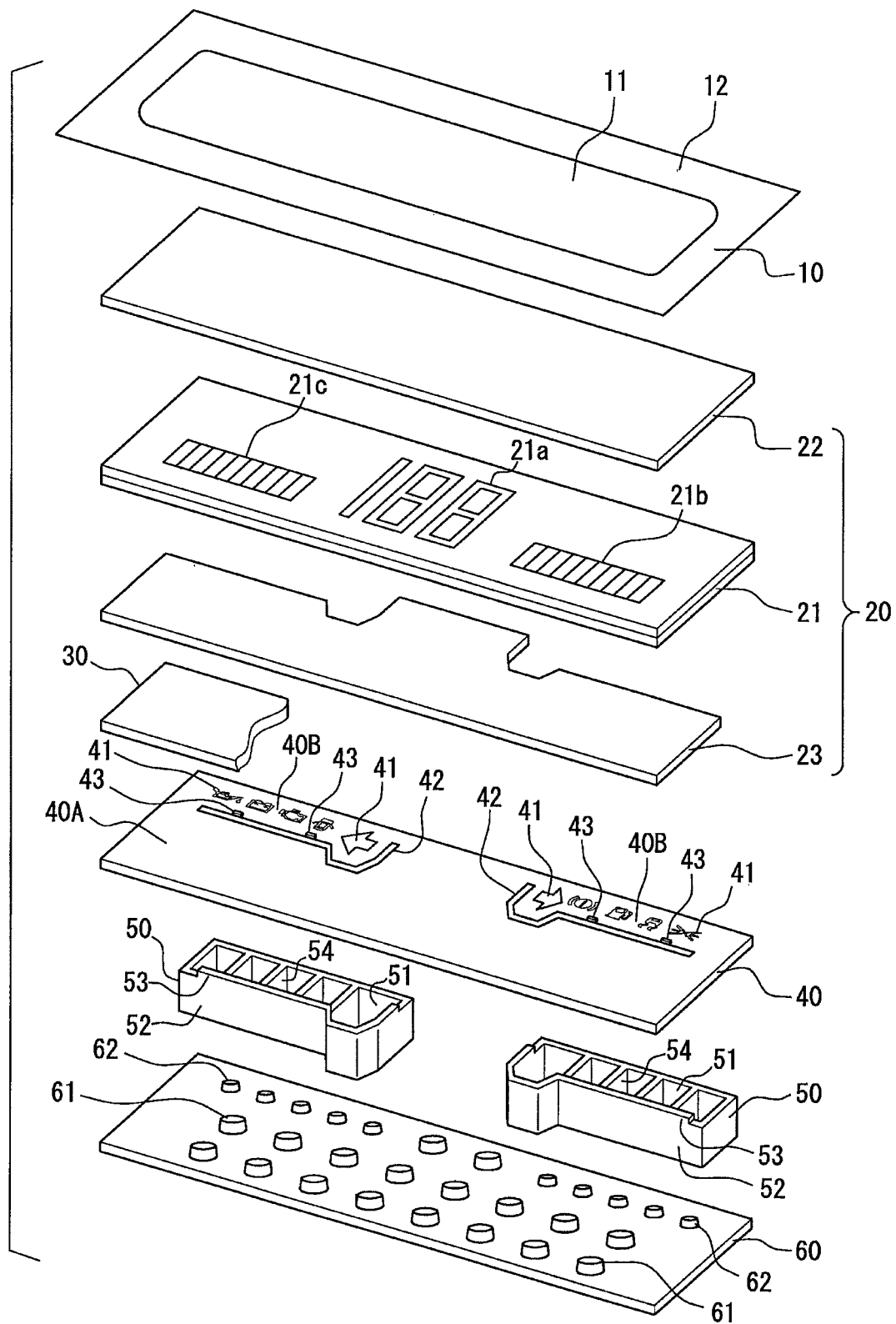
FIG. 1 illustrates an exploded perspective view of a vehicular display apparatus according to an embodiment of the present disclosure.

The following explains a vehicular display apparatus in a vehicle according to an embodiment of the present disclosure with reference to drawings. This display apparatus displays various kinds of vehicle information, such as vehicle speed, remaining fuel, engine speed, anomaly occurrence; the apparatus is attached to an instrument panel of the vehicle to be viewed by a driver (i.e., viewer) of the vehicle. In FIG. 1., the upper side is the side (i.e., a viewer side or front side) facing a viewer; the viewer views the display apparatus from the upper side.

With reference to FIG. 1, the display apparatus is provided by assembling several layers in sequence from the viewer side; the several layers include a frame plate 10, a liquid crystal display unit 20, a directional plate 30, a light shielding member 50, and a circuit board 60.

The frame plate 10 is formed of resin with a light transmissive characteristic (i.e., light transmissive resin). The frame plate 10 includes a light shielding portion 12 and a display portion 11 opposing a display screen of the liquid crystal display unit 20. The light shielding portion 12 is applied with light shielding printing. The display portion 11 is not applied with any light shielding printing; this permits the liquid crystal display unit 20 to be viewable from the viewer side through the display portion 11.

The liquid crystal display unit 20 includes a liquid crystal cell 21 and a pair of deflection plates 22, 23 that sandwich the liquid crystal cell 21. The liquid crystal cell 21 is filled up with liquid crystal material between a pair of glass substrates having transparent electrodes. The light output-side deflection plate 22 and the light input-side deflection plate 23 each deflect the oscillating direction of light into a specified direction to uniform the wave face of the light. Two deflection plates 22, 23 are arranged so as to differentiate the respective deflected directions by an angle of 90 degrees. In addition, in the example illustrated in FIG. 1, the liquid crystal display unit 20 displays a vehicle speed, remaining fuel, and engine speed, respectively, in the display portions 21a, 21b, and 21c in the liquid crystal cell 21.

The circuit board 60 is mounted with a plurality of first light sources 61, and a plurality of second light sources 62, and a microcomputer (unshown). The light sources 61, 62 use light emitting diodes. The microcomputer controls operations of the liquid crystal display unit 20, the first light sources 61, and the second light sources 62 based on acquired vehicle information.

The display plate 40 is formed of light transmissive resin; the display plate 40 is a flexible plate having a plate thickness of 0.5 mm, for example. The display plate 40 includes a diffusion portion 40A and a transmission display portion 40B, which are explained below. The diffusion portion 40A transmits and diffuses the light emitted from the first light sources 61. The light diffused by the diffusion portion 40A transmits through the directional plate 30 so as to be adjusted into directional light before entering the liquid crystal display unit 20.

The directional plate 30 is provided by layering two light transmissive resin films. Two resin films have surfaces provided with prism patterns that reflect the diffused light into the viewer side or the front direction (the upper side in FIG. 1) of the liquid crystal display unit 20. Two resin films are arranged so as to orthogonalize two directions in which the respective prism patterns are arranged. The light diffused by the diffusion portion 40A includes light going outside the angle of visibility of the viewer. Such light outside the angle of visibility can be collected by the directional plate 30 towards the viewer side; this enhances a luminance intensity in the front view.

The diffusion effect by the diffusion portion 40A helps prevent the luminance of the light entering the liquid crystal display unit 20 from changing depending on respective positions, enhancing uniformalization of the luminance by reducing luminance unevenness. That is, the light from a plurality of the first light sources 61 is gathering spot lights; in contrast, the light having passed through the diffusion portion 40A provides a surface luminance that illuminates the whole of the surface uniformly.

Figure 2:
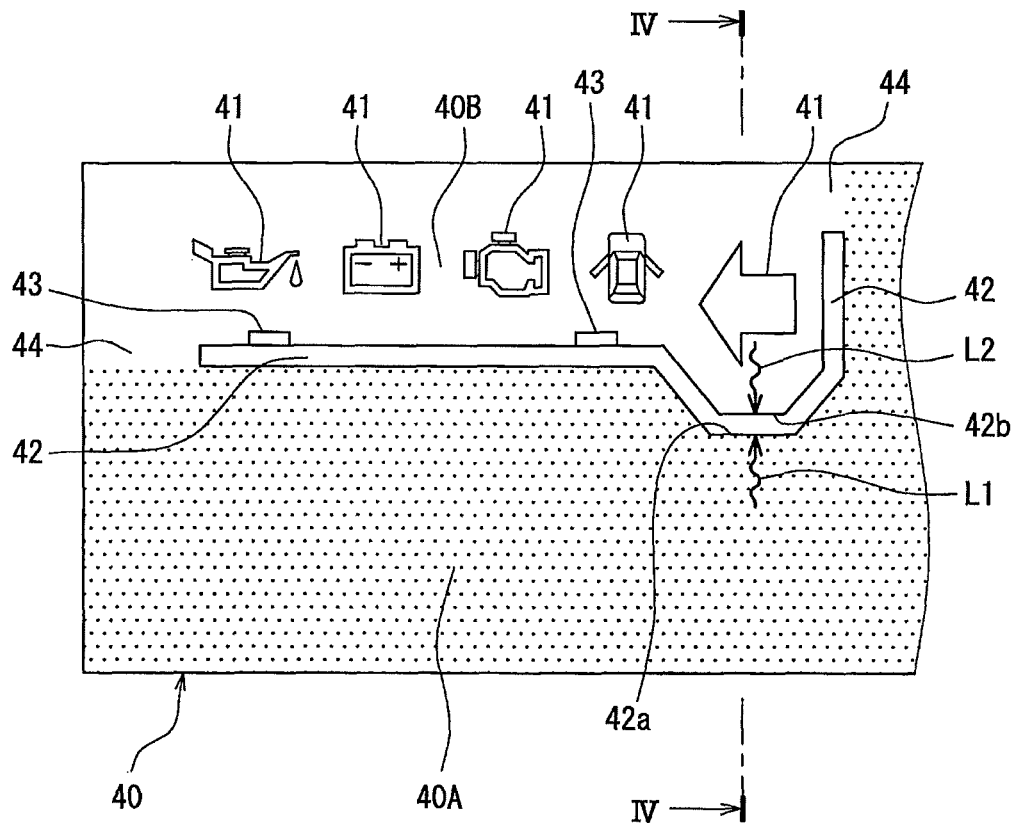
FIG. 2 is a front view of a display plate in FIG. 1.

As illustrated in FIG. 2, the diffusion portion 40A is provided in the region (dotted region in FIG. 2) of the display plate 40 corresponding to the display portions 21a, 21b, and 21c; the transmission display portion 40B is provided in the remaining region of the display plate 40 other than the diffusion portion 40A. The transmission display portion 40B is provided with a plurality of status display portions 41, which represent vehicle statuses such as an alarm display portion reporting an anomaly of the vehicle, a turn display reporting a turn direction of the vehicle. The status display portions 41 transmit the light emitted from the second light sources 62; a remaining portion of the transmission display portion 40B other than the status display portions 41 is applied with light shielding printing. The status display portions 41 may be also referred to as prescribed shape portions; the status display portions 41 are provided in prescribed shapes that represent a pattern, a sign, a character, etc. expressing various kinds of statuses.

That is, the display apparatus according to the present embodiment provides both a liquid crystal display using the first light sources 61 and a transmission luminance display using the second light sources 62. It is noted that the status display portion 41 using the transmission luminance display conducts an alarm display. Even if the first light sources 61 and the liquid crystal display unit 20 break down to disable a normal liquid crystal display, the alarm display by the second light sources 62 is still enabled.

Figure 3:
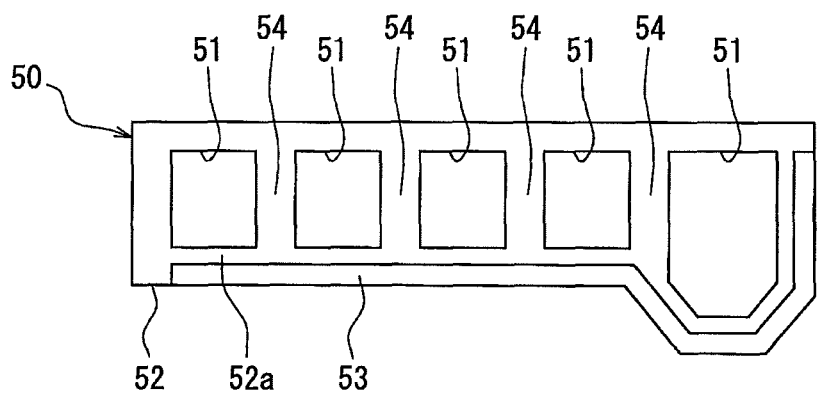
FIG. 3 is a front view of a light shielding member in FIG. 1.

The light shielding member 50 is formed of light shielding resin. As illustrated in FIGS. 1 and 3, the light shielding member 50 includes a plurality of openings 51 arranged to correspond to a plurality of status display portions 41, respectively. The light emitted from the second light source 62 passes through the opening 51 to provide a transmission luminance to the corresponding status display portion 41. That is, the light paths of the second light sources 62 are intercepted from each other by light shielding walls 54 that partition the respective openings 51.

Furthermore, the light shielding member 50 includes a light shielding wall 52 which partitions between (i) the light paths of the first light sources 61 and (ii) the light paths of the second light sources 62. This light shielding wall 52 shields the transmission display portion 40B from the light emitted from the first light sources 61 so as to prevent the light emitted from the first light sources 61 from transmitting through and illuminating the status display portions 41. This light shielding wall 52 shields the diffusion portion 40A from the light emitted from the second light sources 62 so as to prevent the light emitted from the second light sources 62 from transmitting through the diffusion portion 40A.

Figure 4:
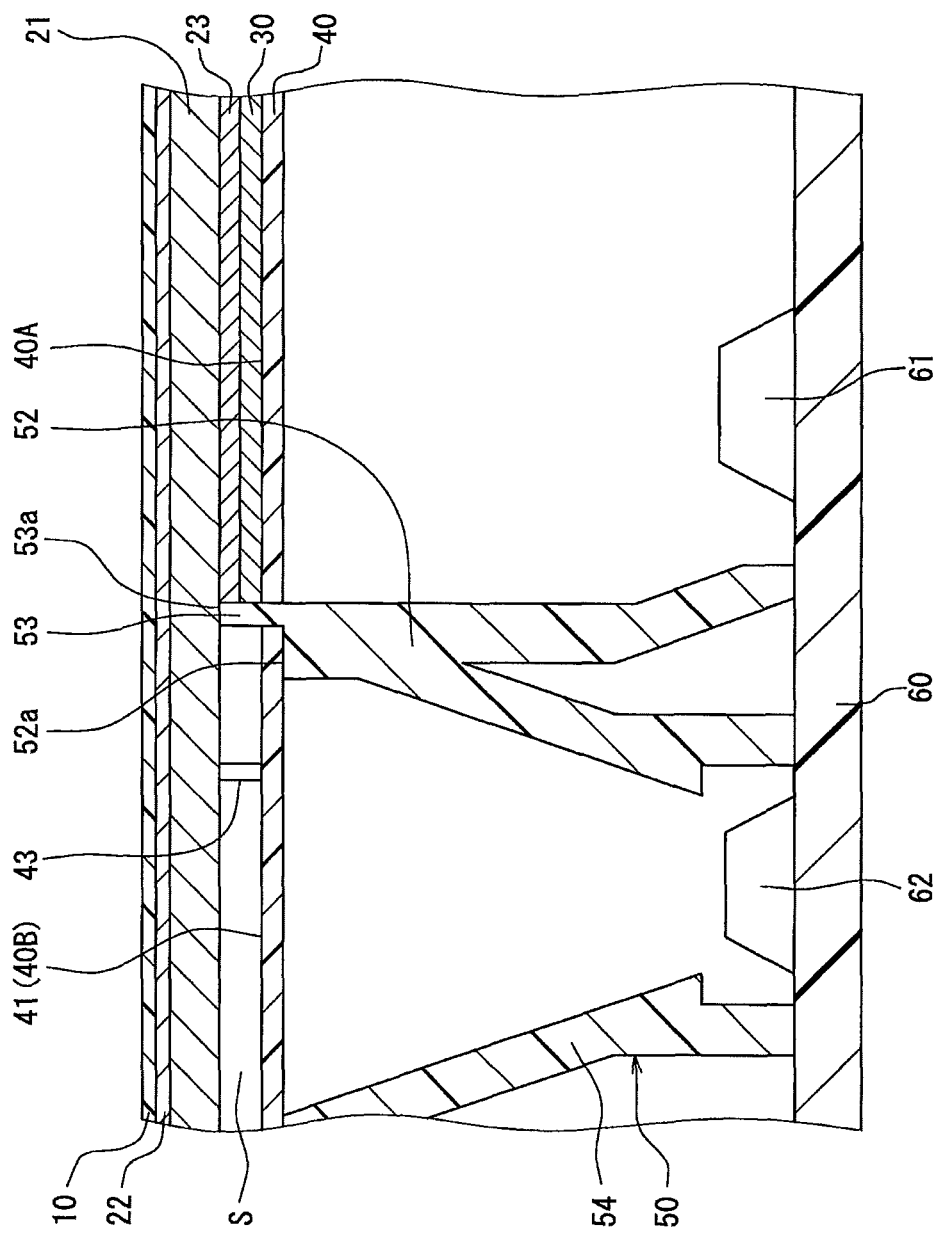
FIG. 4 is a sectional view of the display apparatus taken in the line IV-IV in FIG. 2.

As illustrated in FIGS. 1, 2, and 4, the slit 42 is formed in a portion in between the transmission display portion 40B and the diffusion portion 40A in the display plate 40. The slit 42 is formed to pass through the display plate 40 and extend along a border line between the transmission display portion 40B and the diffusion portion 40A.

It is noted that the display plate 40 includes a plurality of connection portions 44 that connect the transmission display portion 40B and the diffusion portion 40A to each other; the transmission display portion 40B and the diffusion portion 40A are connected by the connection portions 44 so as not to separate from each other. The connection portion 44 is arranged in a distant region of the border line between the transmission display portion 40B and the diffusion portion 40A; the distant region is most distant from the status display portions 41.

As illustrated in FIGS. 1, 3, and 4, the light shielding wall 52 includes an upper end face 52a provided with a convex portion 53 which fits into the slit 42. As illustrated in FIG. 4, the convex portion 53 is formed to pass through the slit 42; the head 53a of the convex portion 53 contact the liquid crystal cell 21.

As illustrated in FIG. 1, the light output-side deflection plate 22 and the display plate 40 each are formed to be identical to the liquid crystal cell 21 in outline shape. In contrast, the light input-side deflection plate 23 and the directional plate 30 each are formed to correspond to the diffusion portion 40A of the display plate 40 in outline shape. Therefore, as illustrated in FIG. 4, the light input-side deflection plate 23 and the directional plate 30 are sandwiched between the diffusion portion 40A and the liquid crystal cell 21; those are layered to be tightly fixed. In contrast, instead of the light input-side deflection plate 23 and the directional plate 30, a predetermined space S is present between the diffusion portion 40A and the liquid crystal cell 21.

The display plate 40 is provided with a spacer 43 that projects to contact the liquid crystal cell 21 and form the space S between the transmission display portion 40B and the liquid crystal cell 21. That is, the spacer 43 contacts the liquid crystal cell 21 so that the transmission display portion 40B of the display plate 40 is pinched between the liquid crystal cell 21 and the light shielding member 50. This configuration helps prevent the transmission display portion 40B from floating from the light shielding member 50. In addition, a plurality of the spacers 43 are provided at a plurality of positions of the display plate 40.

The spacer 43 is formed to be adjacent to the slit 42. For instance, the spacer 43 is formed as follows. The slit 42 is formed by press processing to the display plate 40. In this press processing, a part of the slit remains in the display plate 40 without receiving the press processing. This part that remains is folded to serve as the spacer 43.

The vehicular display apparatus according to the present embodiment provides the following features that exhibit advantageous effects.

Feature 1

The vehicular display apparatus according to the present embodiment includes the liquid crystal display unit 20 and the display plate 40. The display plate 40 includes the diffusion portion 40A which transmits and diffuses light from the first light sources 61, and the transmission display portion 40B, which includes prescribed shape portions serving as the status display portions 41 and permits light from the second light sources 62 to transmit through and illuminate the status display portions 41. The liquid crystal display unit 20 provides a liquid crystal display using, as back light, the light diffused by the diffusion portion 40A. The display plate 40 includes the slit 42 formed in a portion in between the transmission display portion 40B and the diffusion portion 40A.

Under this configuration, the slit 42 helps prevent the light leak, where the light of the first light sources 61 entering the diffusion portion 40A may propagate through the interior portion of the display plate 40, leaking to the transmission display portion 40B. To be specific, the slit 42 includes an end face 42a that reflects the light that proceeds in the arrow L1 in FIG. 2. This helps prevent an occurrence of a situation where the light leak causes a part of the transmission display portion 40B to appear to be luminous even if the second light sources 62 are turned off.

Similarly, under this configuration, the slit 42 helps prevent the light leak, where the light of the second light sources 62 entering the transmission display portion 40B may propagate through the interior portion of the display plate 40, leaking to the diffusion portion 40A. To be specific, the slit 42 includes an end face 42b that reflects the light that proceeds in the arrow L2 in FIG. 2. This helps prevent an occurrence of a situation where the light leakage may cause a part of the liquid crystal display unit 20 to appear to be luminous even if the first light sources 61 are turned off.

Feature 2

The vehicular display apparatus according to the present embodiment may include the light shielding wall 52 to provide a partition between (i) a first light path from the first light sources 61 to the diffusion portion 40A and (ii) a second light path from the second light sources 62 to the transmission display portion 40B. The light shielding wall may include the convex portion 53 that is inserted into the slit 42.

As explained above, the light indicated by the arrows L1, L2 is reflected by the end faces 42a, 42b. However, there is a concern that the light indicated by the arrows L1, L2 may pass through the slit 42 to further proceed without being reflected. To address such a concern, in the present embodiment, the convex portion 53 is inserted into the slit 42; the light going to pass through the slit 42 is intercepted by the convex portion 53. This configuration secures the interception of the light leak between the transmission display portion 40B and the diffusion portion 40A.

Feature 3

The convex portion 53 according to the present embodiment may be provided to pass through the slit 42. Therefore, the convex portion 53 can intercept the light going to pass through the end faces 42a, 42b of the slit 42 over the whole of the plate thickness of the display plate 40.

Further, in the present embodiment, the head 53a of the convex portion 53 may abut to the liquid crystal display unit 20. Therefore, the convex portion 53 is permitted to be a partition between (i) a region of the liquid crystal display unit 20 opposing the diffusion portion 40A and (ii) a region of the liquid crystal display unit 20 opposing the transmission display portion 40B. This configuration helps prevent the light outputted from the transmission display portion 40B from entering the region of the liquid crystal display unit 20 opposing the diffusion portion 40A. Similarly, the same configuration helps prevent the light outputted from the diffusion portion 40A from entering the region of the liquid crystal display unit 20 opposing the transmission display portion 40B.

Feature 4

In the present embodiment, the display plate 40 may be provided to be layered or overlapped with the liquid crystal display unit 20 so as to permit the transmission display portion 40B to be viewable by the light from the transmission display portion 40B penetrating through the liquid crystal display unit 20. Moreover, the directional plate 30 may be provided in between the liquid crystal display unit 20 and the diffusion portion 40A to adjust or change the light diffused by the diffusion portion 40A into directional light. The transmission display portion 40B of the display plate 40 may be provided with the spacer 43 that projects to contact the liquid crystal display unit 20 and form the predetermined space S between the transmission display portion 40B and the liquid crystal display unit 20.

This configuration forms the predetermined space S between the transmission display portion 40B and the liquid crystal display unit 20 and simultaneously pinches the transmission display portion 40B of the display plate 40 in between the liquid crystal display unit 20 and the light shielding member 50. This configuration helps prevent the transmission display portion 40B from floating from the light shielding member 50. This helps prevent a gap from arising between (i) the upper end face 52a of the light shielding wall 52 and (ii) the transmission display portion 40B. As a result, the light leak from the gap can be restricted.

Feature 5

The spacer 43 may be formed to be adjacent to the slit 42. Therefore, as mentioned above, the part of the slit 42 in the display plate 40 may be left without cutting off. The remaining part is bent to be available as the spacer 43. Therefore, it is easy to form the spacer 43 in the display plate 40. Moreover, when the convex portion 53 is inserted into the slit 42, the end faces 42a, 42b may receive frictional force in a direction approaching the liquid crystal cell 21. In the present embodiment, the spacer 43 may be formed in the location adjacent to the slit 42; this configuration helps prevent the transmission display portion 40B from floating from the light shielding member 50 due to the above-mentioned frictional force.

Feature 6

The light input-side deflection plate 23 and the directional plate 30 each may be formed to correspond to the diffusion portion 40A of the display plate 40 in outline shape. Therefore, without transmitting through the deflection plate 23 or the directional plate 30, the light emitted from the transmission display portion 40B transmits through the liquid crystal cell 21, the light output-side deflection plate 22, and the frame plate 10 to permit the viewer to see. Therefore, compared with the case of transmitting through the deflection plate 23 and the directional plate 30, the transmission display portion 40B can be viewable with a high luminance.

In addition, the liquid crystal cell 21 may be provided in a form to transmit the light emitted from the transmission display portion 40B. Further, the light output-side deflection plate 22 may be provided in a form to transmit the light emitted from the transmission display portion 40B. This configuration helps prevent a region of the liquid crystal cell 21 corresponding to the transmission display portion 40B from being viewable.

Other Embodiments

The above embodiment provides the convex portion 53 to be formed to project from the upper end face 52a of the light shielding wall 52 so as to penetrate the slit 42. In contrast, the convex portion 53 may be formed to project from the upper end face 52a up to a middle of the slit 42. Alternatively, the convex portion 53 may be abolished so that the interior portion of the slit 42 may be vacant to provide a space.

The above embodiment provides the spacer 43 to be formed to be adjacent to the slit 42. In contrast, a spacer may be formed in a peripheral end of the transmission display portion 40B in the display plate 40. Alternatively, a spacer may be provided to be a member different from the display plate 40 and attached to the display plate 40 using connection means such as adhesive bond. Alternatively, the spacer 43 may be eliminated from the configuration of the vehicular display apparatus.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A vehicular display apparatus comprising:
   a first light source and a second light source;
   a display plate including
   a diffusion portion that transmits and diffuses first light from the first light source, and
   a plurality of transmission display portions, each transmitting second light from the second light source to permit the second light to transmit through and illuminate a prescribed shape portion;
   a liquid crystal display unit to provide a liquid crystal display using the first light diffused by the diffusion portion as back light,
   the display plate including
   a slit formed in a border portion that is defined as being between (i) each of the transmission display portions and (ii) the diffusion portion, the slit having a length and two ends of the length, the length being formed to be extended along the border portion, and
   a connection portion that connects the diffusion portion with each of the transmission display portions, the connection portion being arranged to be connected with one of the two ends of the slit,
   a light shielding wall to provide a partition between a first light path from the first light source to the diffusion portion and a second light path from the second light source to each of the transmission display portions, the light shielding wall including a convex portion that is inserted into the slit; and
   a circuit board to which the first light source and the second light source are mounted;
   wherein:
   the plurality of transmission display portions are a first transmission display portion and a second transmission display portion;
   the first transmission display portion and the second transmission display portion are arranged to be adjacent to each other via a predetermined intervening region in the display plate;
   the diffusion portion includes (i) a convexly intervening sub-portion and (ii) a different sub-portion from which the convexly intervening sub-portion is protruding, the convexly intervening sub-portion corresponding to the predetermined intervening region so that the convexly intervening sub-portion of the diffusion portion is sandwiched between the first transmission display portion and the second transmission display portion;
   the slit is formed as each of a first slit corresponding to the first transmission display portion and a second slit corresponding to the second transmission display portion, wherein the convexly intervening sub-portion of the diffusion portion is sandwiched between the first slit and the second slit;
   while the convexly intervening sub-portion protruding from the different sub-portion is provided as reaching a peripheral end of the display plate to separate the first transmission display portion and the second transmission display portion from each other;
   the first slit is formed in a first border portion, the first slit having a first length and two first ends of the first length, the first length being formed to be extended along the first border portion,
   the first border portion containing a first sub-portion and a second sub-portion connected with the first sub-portion,
   the first sub-portion being defined in between (i) the first transmission display portion and (ii) the different sub-portion of the diffusion portion,
   the second sub-portion being defined in between (i) the first transmission display portion and (ii) the convexly intervening sub-portion of the diffusion portion; and
   the second slit is formed in a second border portion, the second slit having a second length and two second ends of the second length, the second length being formed to be extended along the second border portion, the second border portion containing a third sub-portion and a fourth sub-portion connected with the third sub-portion, the third sub-portion being defined in between (i) the second transmission display portion and (ii) the different sub-portion of the diffusion portion, the fourth sub-portion being defined in between (i) the second transmission display portion and (ii) the convexly intervening sub-portion of the diffusion portion, the display plate is arranged to face the circuit board;

each of the transmission display portions faces the second light source and displays a prescribed shape formed by the prescribed shape portion contained in each of the transmission display portions by transmitting the second light from the second light source through the prescribed shape portion; and the diffusion portion faces the first light source and transmits and diffuses the first light from the first light source while propagating the first light through an internal portion of the diffusion portion, the first light propagated through the internal portion of the diffusion portion being prevented from leaking to each of the transmission display portions by the slit.

2. The vehicular display apparatus according to claim 1, wherein:

the connection portion is formed as each of a first connection portion, a second connection portion, a third connection portion, and a fourth connection portion;

the first connection portion is located to be connected with one of the two first ends of the first slit, the one of the two first ends of the first slit facing the different sub-portion of the diffusion portion;

the second connection portion is located to be connected with a different one of the two first ends of the first slit, the different one of the two first ends of the first slit facing the convexly intervening sub-portion of the diffusion portion;

the third connection portion is located to be connected with one of the two second ends of the second slit, the one of the two second ends of the second slit facing the different sub-portion of the diffusion portion;

the fourth connection portion is located to be connected with a different one of the two second ends of the second slit, the different one of the two second ends of the second slit facing the convexly intervening sub-portion of the diffusion portion.

3. The vehicular display apparatus according to claim 1, wherein the convex portion has a shape which is fitted into and passes through the slit.

4. The vehicular display apparatus according to claim 1, wherein the display plate and the liquid crystal display unit are layered to permit the transmission display portions to visually appear transparently through the liquid crystal display unit, the vehicular display apparatus further comprising:

a directional plate intervening between the liquid crystal display unit and the diffusion portion of the display plate to transmit the first light diffused by the diffusion portion and provide the transmitted first light with directionality; and a spacer providing a predetermined space in between the liquid crystal display unit and each of the transmission display portions.

5. A vehicular display apparatus comprising, in sequence:

a circuit board;

light sources mounted to the circuit board, the light sources including a first light source and a second light source;

a light shielding wall providing a partition between (i) a first light from the first light source and (ii) a second light from the second light source, the light shielding wall including a convex portion;

a display plate including a diffusion portion that transmits and diffuses the first light from the first light source via the light shielding wall while propagating the first light through an internal portion of the diffusion portion, and a transmission display portion that transmits the second light from the second light source via the light shielding wall to permit the second light to transmit through and illuminate a prescribed shape portion; and a liquid crystal display unit that provides a liquid crystal display using the first light diffused by the diffusion portion as back light, the display plate including a slit formed in a curved border portion that is defined as being between (i) the transmission display portion and (ii) the diffusion portion, the slit having a curved length and two dead ends of the curved length, the curved length being formed to be extended along the curved border portion, the convex portion of the light shielding wall being inserted into the slit, the first light propagated through the internal portion of the diffusion portion being prevented from leaking to the transmission display portion by the slit and the convex portion of the light shielding wall, and a connection portion that connects each of the dead ends of the slit with a peripheral end of the display plate, wherein:

the diffusion portion includes (i) a convexly intervening sub-portion and (ii) a different sub-portion from which the convexly intervening sub-portion is protruding;

the transmission display portion is formed as each of a first transmission display portion and a second transmission display portion that are symmetrical arranged on the display plate;

the slit is formed as each of a first slit and a second slit that are symmetrical arranged on the display plate, the first slit being between (i) the first transmission display portion and (ii) both the convexly intervening sub-portion and the different sub-portion, the second slit being between (i) the second transmission display portion and (ii) both the convexly intervening sub-portion and the different sub-portion; and the convexly intervening sub-portion of the diffusion portion is sandwiched between (i) the first transmission display portion and (ii) the second transmission display portion, while the convexly intervening sub-potion protruding from the different sub-portion is provided as reaching a peripheral end of the display plate to separate, from each other, the first transmission display portion and the second transmission display portion that are symmetrically arranged on the display plate.

6. The vehicular display apparatus according to claim 5, wherein:

the first slit is formed in a first curved border portion, the first slit having a first curved length and two first dead ends of the first curved length, the first curved length being formed to be extended along the first curved border portion, the first curved border portion containing a first sub-portion and a second sub-portion connected with the first sub-portion, the first sub-portion being defined in between (i) the first transmission display portion and (ii) the different sub-portion of the diffusion portion, the second sub-portion being defined in between (i) the first transmission display portion and (ii) the convexly intervening sub-portion of the diffusion portion; and the second slit is formed in a second curved border portion, the second slit having a second curved length and two second dead ends of the second curved length, the second curved length being formed to be extended along the second curved border portion, the second curved border portion containing a third sub-portion and a fourth sub-portion connected with the third sub-portion, the third sub-portion being defined in between (i) the second transmission display portion and (ii) the different sub-portion of the diffusion portion, the fourth sub-portion being defined in between (i) the second transmission display portion and (ii) the convexly intervening sub-portion of the diffusion portion.

7. A display apparatus of a vehicle comprising:

a frame plate;

a circuit board having a plurality of first light emitting diode light sources and a plurality of second light emitting diode light sources;

a liquid crystal display unit having a liquid crystal cell and a light input-side deflection plate and using light from the first light emitting diode light sources, the liquid crystal display unit displaying a vehicle speed, a remaining fuel, and an engine speed;

a transmission luminance display using light from the plurality of second light emitting diode light sources, the transmission luminance display including a plurality of status display portions each indicating a status of the vehicle;

a directional plate having two layered light transmissive resin films, the two layered light transmissive resin films having surfaces provided with prism patterns that reflect diffused light into a viewer side of the directional plate;

a light shielding member formed of a light shielding resin and including a plurality of openings formed by a plurality of light shielding walls that each partitions a corresponding opening from the plurality of openings, the plurality of openings being arranged to correspond to the plurality of status display portions such that light from the plurality of second light emitting diode light sources passes through the plurality of openings to provide a transmission luminance to the plurality of status display portions;

a display plate formed of light transmissive resin with a plate thickness of 0.5 millimeters, the display plate including a diffusion portion that transmits and diffuses light emitted from the plurality of first light emitting diode light sources, light diffused by the diffusion portion being transmitted through the directional plate so as to be adjusted into directional light before entering the liquid crystal display unit, and the light diffused by the diffuser portion including light going outside an angle of visibility of a viewer of the display apparatus that is collected by the directional plate and directed towards a viewer side of the directional plate to increase a luminance intensity of a front view of the display apparatus, the display plate being overlapped with the liquid crystal display unit to permit the transmission luminance display to be viewable with light penetrating through the liquid crystal display unit, the directional plate changing light diffused by the diffusion portion into directional light; and a spacer that contacts the liquid crystal display unit and forms a predetermined space between the transmission luminance display and the liquid crystal display unit while pinching the transmission luminance display in between the liquid crystal display unit and the light shielding member to prevent the transmission luminance display from floating from the light shielding member and to prevent a gap from arising between an upper end face of the plurality of light shielding walls and the transmission luminance display;

wherein a slit is formed in a portion in between the transmission luminance display and the diffusion portion of the display plate, the slit being formed to pass through the display plate and extend along a border line between the transmission luminance display and the diffusion portion, the display plate including a plurality of connection portions that each connects the transmission luminance display with the diffusion portion, the plurality of connection portions being arranged in a distant region from the border line between the transmission luminance display and the diffusion portion, the distant region being a most distant area from the plurality of status display portions on the transmission luminance display, the slit including first and second end faces that reflect light, the first end face reflecting light from the diffusion portion to prevent light leakage that may cause a part of the transmission luminance display to appear luminous when the plurality of second light emitting diode light sources are turned off, the second end face reflecting light from the transmission luminance display to prevent light leakage that may cause a part of the liquid crystal display unit to appear luminous when the plurality of first light emitting diode light sources are turned off, the light shielding member having a convex portion that intercepts light going to pass through one of the first and second end faces, the convex portion having a head that abuts the liquid crystal display unit such that the convex portion partitions between a region of the liquid crystal display unit opposing the diffusion portion and a region of the liquid crystal display unit opposing the transmission luminance display to prevent light outputted from the transmission luminance display from entering the region of the liquid crystal display unit opposing the diffusion portion and to prevent light outputted from the diffusion portion from entering the region of the liquid crystal display unit opposing the transmission luminance display, the first and second end faces receiving frictional force in a direction approaching the liquid crystal cell, the spacer being formed in a location adjacent to the slit to prevent the transmission luminance display from floating from the light shielding member due to the frictional force, the light input-side deflection plate and the directional plate each having an outline shape that corresponds to the diffusion portion such that light emitted from the transmission luminance display is transmitted through the liquid crystal cell, a light output-side deflection plate, and the frame plate to increase luminance of the display apparatus.

8. The display apparatus of claim 7, wherein the convex portion is formed to project from the upper end face of the plurality of light shielding walls to penetrate the slit.

* * * * *